No. 860,369. PATENTED JULY 16, 1907.
J. R. GRUNDY.
SHAFT COLLAR.
APPLICATION FILED JAN. 28, 1907.
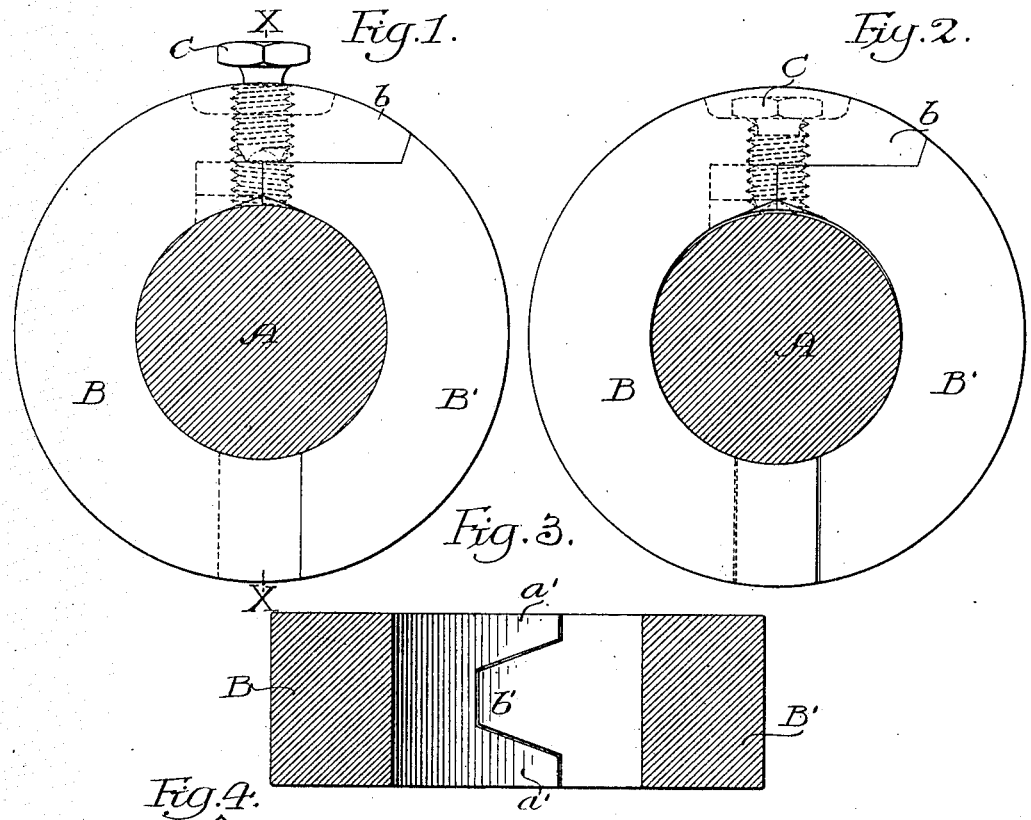
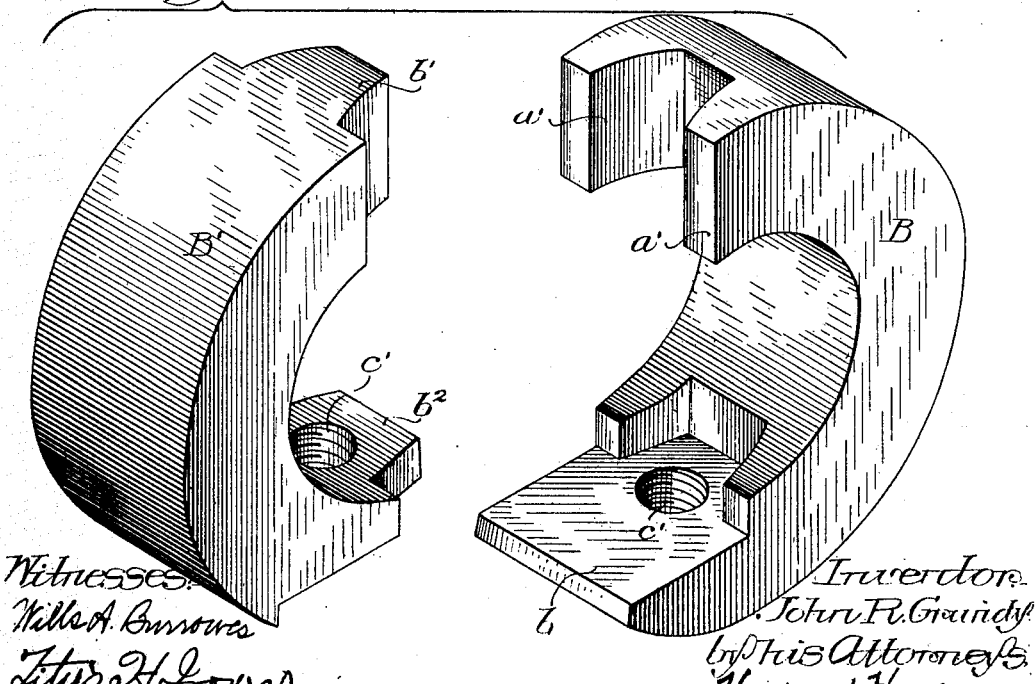

UNITED STATES PATENT OFFICE.

JOHN R. GRUNDY, OF PHILADELPHIA, PENNSYLVANIA.

SHAFT-COLLAR.

No. 860,369.      Specification of Letters Patent.      Patented July 16, 1907.

Application filed January 28, 1907. Serial No. 354,530.

To all whom it may concern:

Be it known that I, JOHN R. GRUNDY, a citizen of the United States, residing in Philadelphia, Pennsylvania, have invented certain Improvements in Shaft-Collars, of which the following is a specification.

The object of my invention is to provide a shaft collar made in two parts held together and to the shaft by a single screw; these parts being so constructed that when the said screw is set up, the opposite pair of abutting ends of the two parts cannot separate by reason of the fact that they are in effect hooked to the shaft on which the collar is placed. It is further desired to provide a shaft collar made in two halves and held together and to the shaft by a single screw passing through one pair of abutting ends of the two parts; the construction of the collar being such that it is relatively inexpensive to make and capable of being quickly and conveniently applied to a shaft. These objects I attain as hereinafter set forth, reference being had to the accompanying drawings, in which:—

Figure 1 is a side elevation illustrating my improved collar as applied to a shaft, the various parts being illustrated in the positions occupied before the set screw is set up; Fig. 2, is a side elevation illustrating the various parts in the positions occupied after the set screw has been set up so as to hold together the parts of the collar and to retain the same fixed to the shaft; Fig. 3, is a sectional plan of the interior of the collar, showing the construction of one pair of the abutting ends, and Fig. 4, is a detached perspective view of the two parts of the collar.

In the above drawings, A represents the shaft upon which the collar is designed to be fixed and B and B′ represent the two parts of said collar. This latter when its parts are together, is preferably a plane annulus of rectangular section and is provided with a single screw C, which passes through two of the abutting ends of the parts B and B′ on a line substantially radial to the shaft.

As shown best in Figs. 3 and 4, it will be seen that one end of the part B′ of the collar has a projecting portion b′, which, in the case illustrated, is trapezoidal in section, though it is obvious that it may be substantially triangular or of any other suitable shape. This projection fits into a correspondingly shaped recess in the adjacent end of the part B of the collar. The two parts of the collar are preferably substantially equal and the end of the part B opposite that having the recess for the projection b′, has an overhanging portion b while the end of the part B′ adjacent thereto is suitably recessed for the reception of this overhung portion. Said end of the part B′, however, is in addition provided with a projecting part $b^2$ of trapezoidal or other suitable shape, and, as shown in Fig. 4, the adjacent end of the part B is recessed to receive said projection. A threaded hole c′ for the screw C is formed through the overhanging part b and there is in line therewith a second threaded hole c′ formed through the projection $b^2$ of the part B′.

It is characteristic of my device that the projection b′ of the part B extends beyond a diametrical line X—X drawn through the axis of the screw C and similarly the two edges or end portions a′ of the part B′ forming the sides of the recess for the reception of the projection b′, extend on the opposite side of said diametrical line. As a result, when the screw C is set up so as to pass through the holes c′ in the parts B′ and B and engage the shaft, the collar as a whole is moved so that the ends of its portions b′ and a′ closely and tightly engage said shaft. Consequently even though this setting up of the screw C should and does tend to cause these opposite ends of the two parts B and B′ of the collar to separate, such action is rendered impossible for the reason that both the projection b′ and the ends a′ are in effect hooks in engagement with the shaft. Consequently the ends of the collar opposite those having the screw C are held together and to the shaft without danger of opening or coming apart.

It is obvious that by using the single screw in place of a plurality of screws, as has hitherto been considered necessary, I am enabled to reduce the cost of the collar, while the device as a whole is such as to be very quickly and conveniently applied to a shaft of suitable size. It is, moreover, to be noted that by the provision of the projecting portions b′ and $b^2$, it is a practical impossibility for the two parts of the shaft collar to move independently of each other longitudinally of the shaft, and in spite of the fact that when the screw is set up the parts b′ and a′ serve as hooks to hold the collar to the shaft, the parts of said collar are placed in position on the shaft by being moved toward it in radial planes; that is to say, it is not necessary to first move the parts of the collar in radial lines and then slide them together by moving them longitudinally of the shaft. It is, of course, obvious that in order to make possible this placing of the two parts B and B′ upon a shaft, the inner edge portions of said parts opposite the projections a′ and b′ must be cut away to an amount substantially equal to the amounts by which said projections hook upon or on to the shaft.

I claim:—

1. A shaft collar made in two parts, and means for holding the parts together comprising a single screw passing through two adjacent ends of said two parts, the other ends of said parts being formed to co-act with the shaft to prevent their separation; substantially as described.

2. A shaft collar made in two parts, one of an adjacent pair of ends of said parts being provided with a recess and the other end projecting into the same so as to prevent relative movement of the two parts of the collar in the line of the shaft, with means comprising a single screw passing through one pair of adjacent ends, for holding together the parts of the collar, the ends of said parts opposite said screw being formed to engage the shaft to prevent their separation, substantially as described.

3. A shaft collar made in two parts, of which one is provided with an overhung portion and the adjacent end of another is provided with a recess for the reception of the same, and a screw passing radially through said overhung portion and through the adjacent end of the other part of the collar, the opposite ends of said two collar parts being constructed to engage the shaft to prevent their separation when said screw is set up, substantially as described.

4. A shaft collar made in two parts, in combination with a shaft, with a screw passing radially through one pair of adjacent ends of said parts, the opposite ends of the collar parts being extended in opposite directions around the shaft so as to engage the same beyond the line of the screw and prevent separation of said parts, substantially as described.

5. The combination of a shaft, with a shaft collar made in two parts, a screw passing through an adjacent pair of ends of the parts, one of the other pair of ends being provided with a recess and the other with a projection fitting into the same, said projection extending around the shaft beyond the line of the screw so as to engage said shaft and hold said parts thereto when the screw is set up, substantially as described.

6. The combination of a shaft with a collar therefor made in two separable parts, one of a pair of the adjacent ends of said parts being overhung and the other provided with a recess for the reception of said overhung end, there being a recess in the overhung end and a projection on the other part of the collar fitting into the same, a screw threaded through said two ends, with a recess-and-projection connection between the remaining pair of adjacent ends of the parts of the collar, said latter ends being constructed to engage the shaft so as to be independently prevented from separating when the screw is set up, substantially as described.

7. The combination of a shaft with a collar therefor made in two separable parts, one of a pair of the adjacent ends of said parts being overhung and the other provided with a recess for the reception of said overhung end, there being a recess in the overhung end and a projection on the other part of the collar fitting into the same, a screw threaded through said two ends, with a recess-and-projection connection between the remaining pair of adjacent ends of the parts of the collar, each of the ends of the latter pair being extended around the shaft in engagement with the same beyond the line of the screw, substantially as described.

8. The combination of a collar made in two parts, and means for holding said parts together consisting of a connecting device for one pair of adjacent ends of said collar, with a structure holding the other ends independently of each other so as to prevent them from separating when the connecting device is applied, substantially as described.

In testimony whereof, I have signed my name to this specification, in the presence of two subscribing witnesses.

JOHN R. GRUNDY.

Witnesses:
E. R. LOUGHERY,
WM. A. BARR.